United States Patent
Kim et al.

(10) Patent No.: US 11,218,954 B2
(45) Date of Patent: Jan. 4, 2022

(54) METHOD AND DEVICE FOR PERFORMING, BY VEHICLE-TO-EVERYTHING USER EQUIPMENT, OPERATION RELATED TO RADIO ACCESS TECHNOLOGY SWITCH IN WIRELESS COMMUNICATION SYSTEM

(71) Applicant: LG Electronics Inc., Seoul (KR)

(72) Inventors: Laeyoung Kim, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/635,712

(22) PCT Filed: Jul. 31, 2018

(86) PCT No.: PCT/KR2018/008695
§ 371 (c)(1),
(2) Date: Jan. 31, 2020

(87) PCT Pub. No.: WO2019/027233
PCT Pub. Date: Feb. 7, 2019

(65) Prior Publication Data
US 2021/0136671 A1     May 6, 2021

Related U.S. Application Data

(60) Provisional application No. 62/541,057, filed on Aug. 3, 2017, provisional application No. 62/539,506, filed on Jul. 31, 2017.

(30) Foreign Application Priority Data

Jun. 20, 2018  (KR) .................. 10-2018-0070538

(51) Int. Cl.
*H04W 48/18*       (2009.01)
*H04W 4/40*        (2018.01)
(Continued)

(52) U.S. Cl.
CPC ........... *H04W 48/18* (2013.01); *H04W 4/021* (2013.01); *H04W 4/40* (2018.02);
(Continued)

(58) Field of Classification Search
CPC ....... H04W 48/18; H04W 76/11; H04W 4/40; H04W 4/021; H04W 28/0268; H04W 92/18
(Continued)

(56) References Cited

U.S. PATENT DOCUMENTS 10,694,427 B2 *  6/2020  Shan .................... H04W 60/04
2013/0088983 A1   4/2013  Pragada et al.
(Continued)

FOREIGN PATENT DOCUMENTS

| KR | 101579636 | 12/2015 |
|---|---|---|
| KR | 101729476 | 4/2017 |
| KR | 20170068976 | 6/2017 |

OTHER PUBLICATIONS

Chen et al., "V2X Services Supported by LTE-Based Systems and 5G", IEEE Communications standards magazine, Jun. 2017, 7pages (Year: 2017).*

(Continued)

*Primary Examiner* — Mong-Thuy T Tran
(74) *Attorney, Agent, or Firm* — Fish & Richardson P.C.

(57) ABSTRACT

An embodiment of the present invention relates to a method for performing an operation related to changing of a radio access technology (RAT), by a vehicle-to-everything (V2X) terminal in a wireless communication system, the method comprising the steps of: checking mapping information by a first UE; selecting a first RAT according to the mapping information; and transmitting a message including one of information indicating that the first RAT has been selected and information indicating a switch to the first RAT to all (Continued)

UEs belonging to a group, wherein, in the mapping information, one or more RATs are mapped to each V2X service with respect to a geographical area.

7 Claims, 10 Drawing Sheets

(51) Int. Cl.
    *H04W 76/11*     (2018.01)
    *H04W 28/02*     (2009.01)
    *H04W 4/021*     (2018.01)
    *H04W 92/18*     (2009.01)

(52) U.S. Cl.
    CPC ........ *H04W 28/0268* (2013.01); *H04W 76/11* (2018.02); *H04W 92/18* (2013.01)

(58) Field of Classification Search
    USPC ........................................................ 370/329
    See application file for complete search history.

(56) References Cited

U.S. PATENT DOCUMENTS

| | | |
|---|---|---|
| 2015/0004966 A1 | 1/2015 | Ayleni et al. |
| 2016/0234874 A1* | 8/2016 | Jung ...................... H04W 76/23 |
| 2016/0285935 A1* | 9/2016 | Wu ........................ G08G 1/161 |
| 2016/0295624 A1* | 10/2016 | Novlan .................. H04W 72/04 |
| 2019/0124489 A1* | 4/2019 | Ahmad ................... H04W 4/40 |
| 2019/0150082 A1* | 5/2019 | Kedalagudde .......... H04W 4/46 |
| | | 370/329 |
| 2019/0335532 A1* | 10/2019 | Kim ....................... H04W 72/02 |
| 2020/0228948 A1* | 7/2020 | Watfa ...................... H04L 67/16 |

OTHER PUBLICATIONS

PCT International Search Report and Written Opinion in International Application No. PCT/KR2018/008695, dated Nov. 20, 2018, 19 pages (with English translation).

* cited by examiner

METHOD AND DEVICE FOR PERFORMING, BY VEHICLE-TO-EVERYTHING USER EQUIPMENT, OPERATION RELATED TO RADIO ACCESS TECHNOLOGY SWITCH IN WIRELESS COMMUNICATION SYSTEM

CROSS-REFERENCE TO RELATED APPLICATIONS

This application is a National Stage application under 35 U.S.C. § 371 of International Application No. PCT/KR2018/008695, filed on Jul. 31, 2018, which claims the benefit of Korean Application No. 10-2018-0070538, filed on Jun. 20, 2018, U.S. Provisional Application No. 62/541,057, filed on Aug. 3, 2017, and U.S. Provisional Application No. 62/539,506, filed on Jul. 31, 2017. The disclosures of the prior applications are incorporated by reference in their entirety.

TECHNICAL FIELD

The following description relates to a wireless communication system, and more particularly, to a method and apparatus for efficiently providing a V2X service through a 3 GPP 5G system (e.g., 5G mobile communication system, a next generation mobile communication system) and an EPS.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Task

The technical task of the present disclosure is to provide a method for a V2X UE to perform an operation related to an RAT change.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

In one technical aspect of the present disclosure, provided herein is a method of performing an operation related to a Radio Access Technology (RAT) change by a Vehicle-To-Everything (V2X) User Equipment (UE) in a wireless communication system, the method including checking a mapping information by a first UE, selecting a first RAT according to the mapping information, and sending a message containing one of an information indicating that the first RAT has been selected and an information instructing a switch to the first RAT to all UEs belonging to a group, wherein the mapping information may have one or more RATs mapped per V2X service for a geographical area.

In another technical aspect of the present disclosure, provided herein is a V2X User Equipment (UE) performing an operation related to a RAT change in a wireless communication system, the V2X UE including a transceiver and a processor configured to check a mapping information by a first UE, select a first RAT according to the mapping information, and send a message containing one of an information indicating that the first RAT has been selected and an information instructing a switch to the first RAT to all UEs belonging to a group, wherein the mapping information may have one or more RATs mapped per V2X service for a geographical area.

The method may further include receiving a response to the instruction or selection from the all UEs belonging to the group.

If any one of the UEs belonging to the group fails to be supported by the first RAT, the selection of the first RAT or the switch to the first RAT may be skipped.

The method may further include performing an RAT switch to the first RAT.

The mapping information may include a time information for using each of the one or more RATs, a QoS parameter that should be satisfied at each of the one or more RATs, and a congestion degree of each of the one or more RATs.

The QoS parameter may include one or more of a latency, a delay budget, a transmission delay, a packet error loss rate, a transmission failure rate, a transmission success rate, and a data rate related value.

The message may include at least one of a target RAT information, an information related to a time of performing the switch to the first RAT, an information indicating whether the message is the information indicating that the first RAT has been selected or the information instructing the switch to the first RAT, an identification information on a group communication, and an identification information on a representative UE.

The identification information on the group communication may include one of an identification information on the V2X service, an identification information on a V2X application, an identification information on the group, an identification information on the group communication, and an address information used for the group communication.

The identification information on the representative UE may include one of an identification information on a UE used in an application layer and an address information used for the group communication.

The first UE may be a representative UE of the group.

The representative UE may include one of a leader of a group communication, a UE at the head of a progress direction among UEs performing the group communication, a UE initiating the group communication, and a UE designated/elected to operate as the representative UE.

The one or more RATs may include E-UTRA and New Radio (NR).

Advantageous Effects

According to the present disclosure, an RAT change can be performed while supporting a V2X specific service.

It will be appreciated by persons skilled in the art that the effects that can be achieved with the present disclosure are not limited to what has been particularly described herein-above and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE FOR DISCLOSURE

Figure 1:
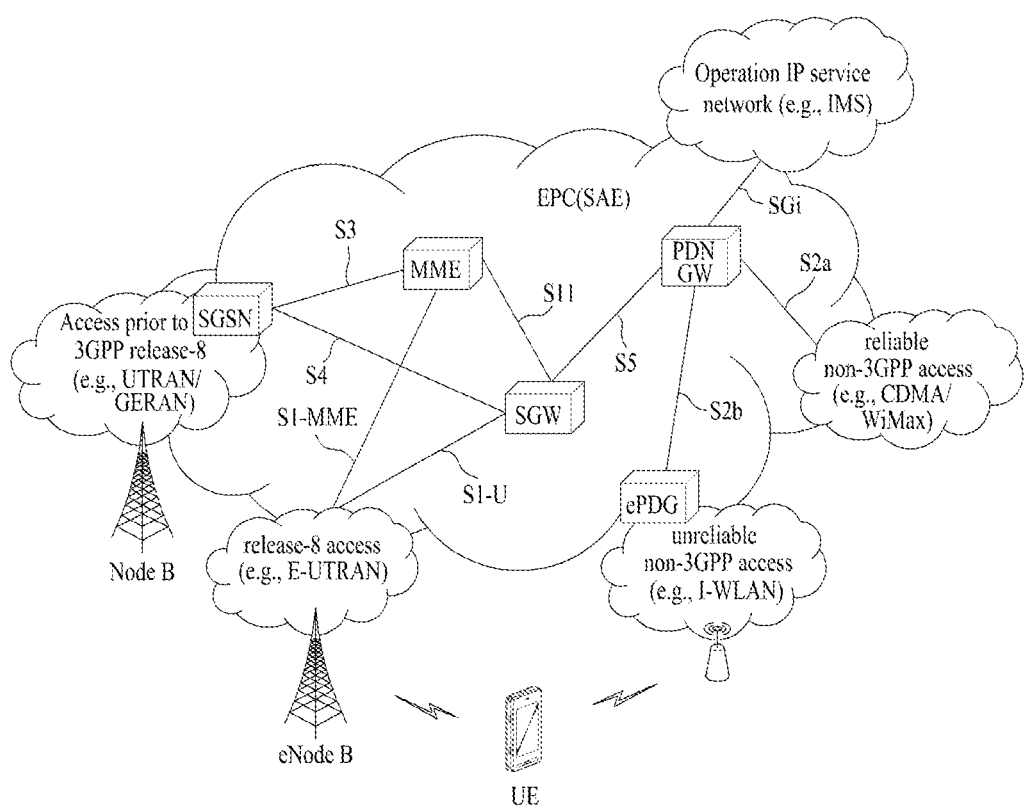
FIG. 1 is a schematic diagram illustrating the structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LEE, and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |

TABLE 1-continued

| Reference point | Description |
|---|---|
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
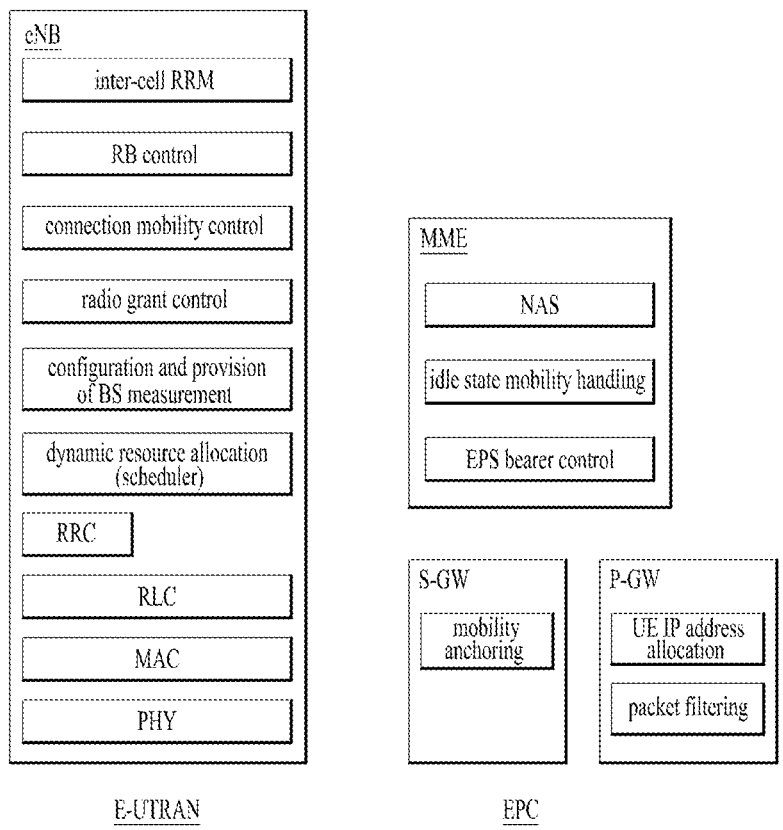
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
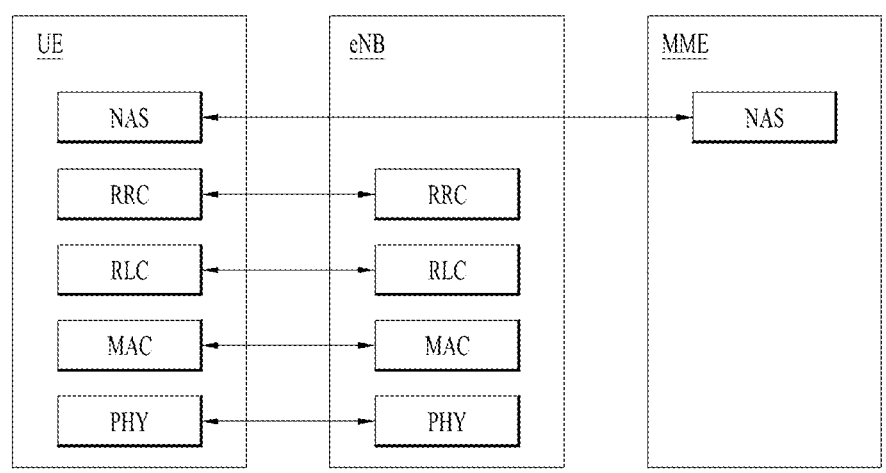
FIG. 3 is a diagram illustrating the structure of a radio interface protocol in a control plane.
Figure 4:
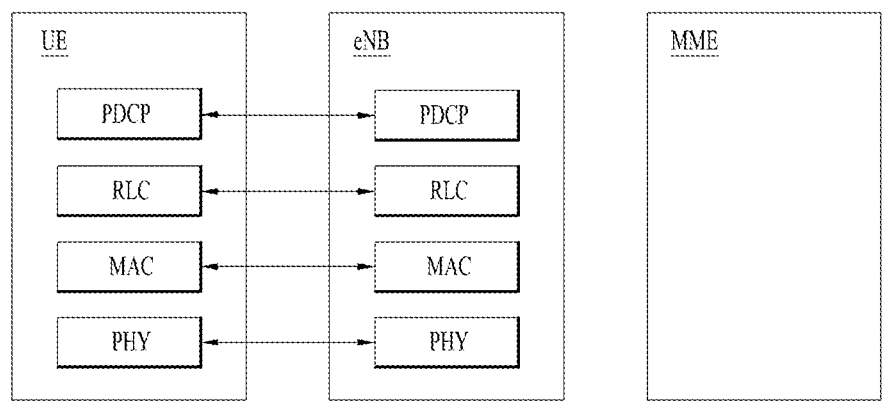
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell.

In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
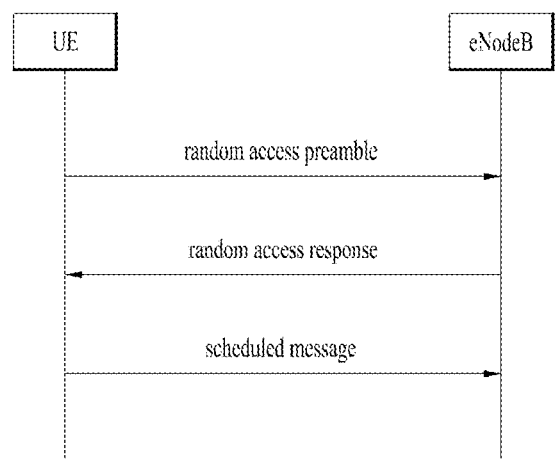
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
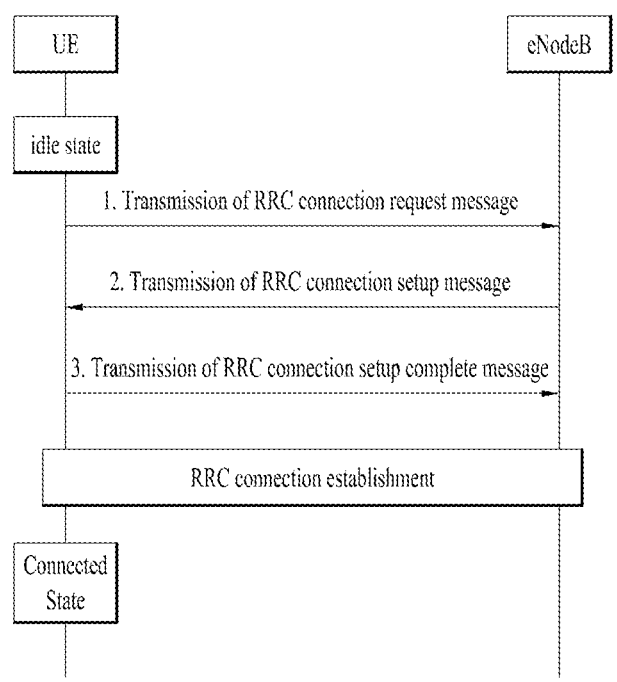
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
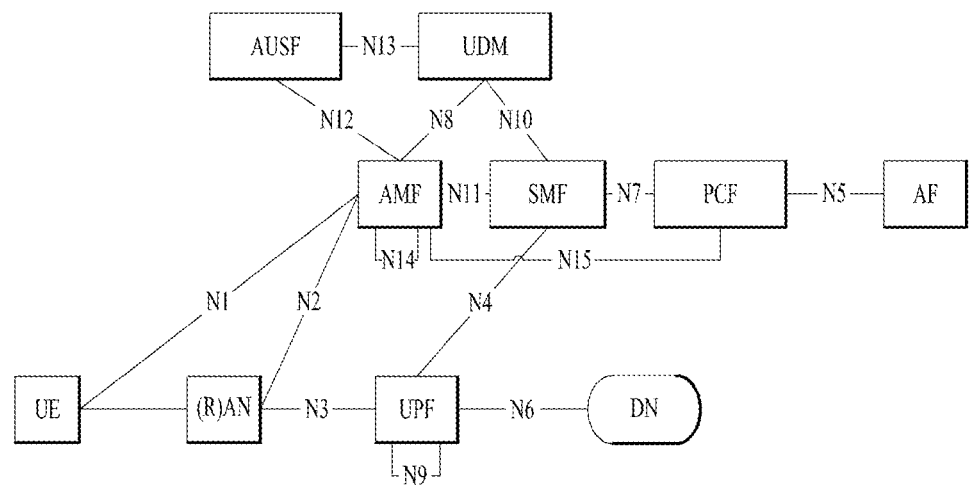
FIG. 7 is a diagram illustrating a $5^{th}$ generation (5G) system.

An MME in a conventional EPC is divided into a Core Access and Mobility Management Function (AMF) and a Session Management Function (SMF) in a next generation system (or 5G Core Network (CN)). Hence, NAS interaction and Mobility Management (MM) with a UE are performed by the AMF and Session Management (SM) is performed by the SMF. The SMF also manages a User Plane Function (UPF) that is a gateway for routing user traffic. This may be regarded as the SMF is responsible for a control-plane part of an S-GW and a P-GW in the conventional EPC and as the UPF is responsible for a user-plane part. For the routing of the user traffic, one or more UPFs may exist between an RAN and a Data Network (DN). Namely, the conventional EPC may be configured as exemplarily shown in FIG. 7. In addition, as a concept corresponding to PDN connection in the conventional EPS, a Protocol Data Unit (PDU) session is defined in the 5G system. The PDU session is referred to as association between a UE and a DN, which provides a PDU connectivity service of an Ethernet or unstructured type as well as an IP type. Besides, a Unified Data Management (UDM) performs a function corresponding to an HSS of the EPC and a Policy Control Function (PCF) performs a function corresponding to a PCRF of the EPC. Of course, such functions may be provided in an extended form to meet the requirements of the 5G system. Details of 5G system architecture, each function and each interface refer to TS 23.501.

On the other hand, in 3GPP, the architecture enhancements study for advanced V2X with the scope described in Table 2 is in progress (see 3GPP SP-170590). This study contents are described in TR 23.786.

TABLE 2

The objectives of this study are to identify and evaluate potential architecture enhancements of EPS and 5G System design needed to support advanced V2X services identified in TR 22.886, based on vehicular services requirements defined in SA1 V2X (TS 22.185) and eV2X (TS 22.186) and determine which of the solutions can proceed to normative specifications.
The detailed objectives are as follows:
1. Investigate and evaluate the possible reuse/enhancement of existing functionalities and architectures (e.g. NR, E-UTRA, NG-RAN, E-UTRAN, 5G CN, EPC) in order to support advanced V2X services, including but not limited to:
platooning, extended sensor sharing, ranging to enhance positioning accuracy and other network based positioning enhancements, advanced driving, and remote driving.
2. Identify which of the solutions for architecture enhancements could proceed to normative specifications.
The timely completion of the EPS part of the study by September, 2017 is targeted, aiming at allowing normative work in Rel-15 timeframe. This study will align with the 5GS Phase 1 normative work. The 5G System support for V2X will also depend on features that need to be studied in other 5GS study items.
Architectural implications for RAN will be coordinated with RAN WGs.

The architecture enhancements study for advanced V2X attempts to meet the service requirements described in TS 22.186. Among these service requirements, there is a requirement as shown in Table 3.

TABLE 3

[R.5.1-015] The 3GPP system shall be able to support the operators to select which 3GPP RAT to use for a V2X application.

NOTE 3:
Different V2X applications can be identified by use of different ITS-AID or PSID.

To find a solution that satisfies the above-mentioned service requirements, TR 23.786 defines the intention disclosed in Table 4.

TABLE 4

*5.2 Key Issue #2: 3GPP PCS RAT selection for a V2X application
5.2.1 General description
A UE may support multiple radio access technologies (RATs) over PC5 interface, including LTE and NR. For such UE, the most suitable 3GPP PC5 RAT(s) for V2X applications should be selected based on various criteria.
For example, for the V2X application requiring low latency, the PC5 RAT that meets the required latency should be selected.
To support the proper selection of 3GPP PC5 RAT to use for a V2X application, the following aspects need to be studied:
    What parameters should be considered as input to 3GPP PC5 RAT selection for each V2X application, e.g. QoS parameters RAN related parameters such as expected range of a RAT, operator policy, preferences for each V2X application, peer UE capabilities, etc.?
    When and how the 3GPP PC5 RAT selection is performed? Is the 3GPP PC5 RAT selected before sending/receiving each V2X message, or is the 3GPP PC5 RAT selected based on static configuration for each V2X application?
    How can 3GPP system support the 3GPP PC5 RAT selection for the V2X application?
When studying the above aspects, the following need to be considered:
    When the UE is non-roaming and when the UE is roaming;
    When the UE is in coverage and when the UE is out of coverage.
    Editor's note: When necessary, RAN WGs should be involved during the study of this key issue.

As noted above, when a UE is capable of performing an operation of PC5 (which is an interface defined by 3GPP for Device To Device (D2D) or Proximity based Service (Prose)) using a multitude of Radio Access Technologies (RAT), a mechanism relating to what kind of RAT can be used for a specific V2X application is required. RAT types in the above description representatively include LTE (i.e., E-UTRA) and NR, by which the RAT types are non-limited. And, any RAT capable of the PC5 operation can be included.

The most important element in the V2X service is the interaction between UEs. That is, a V2X message sent by a first UE should be received by other UEs travelling around the first UE and/or member UEs of a group to which the first UE belongs. If so, road safety is realized and cooperative driving such as platooning becomes possible. By considering such matters, the present disclosure proposes a mechanism for selecting an RAT that a V2X application should use for a PC5 operation.

Embodiment 1

Figure 8:
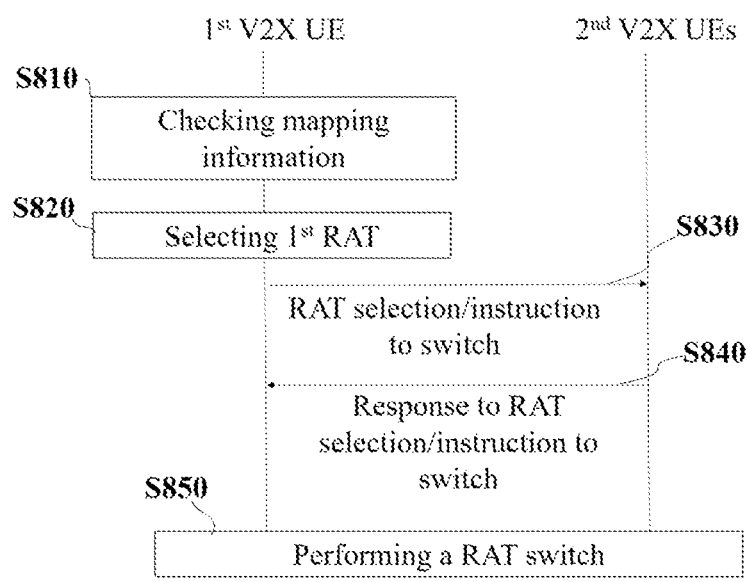
FIG. 8 is a diagram illustrating a RAT switch operation of the present disclosure.

According to one embodiment of the present disclosure, as shown in FIG. 8, a first UE may check mapping information (S810) and select a first RAT according to the mapping information (S820). And, a message including one of an information indicating that the first RAT has been selected and an information indicating a switch to the first RAT may be sent to all UEs belonging to a group (S830). In case of the switch, the representative UE instructs all UEs (i.e., other UE(s) participating in a group communication as well as the representative UE itself) participating in the corresponding group communication to switch an RAT for performing the group communication to a second PC5 RAT from a first PC5 RAT. In case of an RAT selection, the representative UE selects an RAT for all UEs (i.e., other UE(s) participating in the corresponding group communication as well as the representative UE itself) to use/apply to perform the group communication and then informs them of the selected RAT. The group communication may be construed as a V2X service for enabling the group communication to be performed.

Here, the mapping information may include information indicating that one or more RATs are mapped per V2X service for a geographical area. The mapping information will be described in detail later.

As described above, after sending the information related to the selection/switch of the first RAT, the first UE may perform an RAT selection/switch to the first RAT. Yet, when a response to the indication or selection is received from all the UEs belonging to the group (S840), if any one of the UEs belonging to the group is not supported by the first RAT, the selection of the first RAT or the switch to the first RAT may not be performed. All the UEs (including the representative UE) participating in the group communication perform the RAT selection/switch to the same target RAT at the same timing (S850). In case of a use (selection), all the UEs (including the representative UE) participating in the group communication select and use the same RAT. In case of the switch, all the UEs (including the representative UE) participating in the group communication perform the RAT switch to the same target RAT at the same timing. Regarding the responses of the UEs belonging to the same group, a UE having received the RAT switch instruction/request from the representative UE may send an ACK/response to the representative UE. Additionally, after the representative UE received ACKs/responses from all other UEs participating in the group communication and then sent a confirmation message to other UEs through PC5, all the UEs may be allowed to perform the RAT switch operation. Having received the RAT use (selection) instruction/request from the representative UE, a UE may send an ACK/response to the representative UE. Additionally, after the representative UE received ACKs/responses from all other UEs participating in the group communication and then sent a confirmation message to other UEs through PC 5, all the UEs may be allowed to perform the RAT use (selection) operation.

Through the configuration mentioned above, a problem that may be caused on an RAT change in a V2X group may be solved. Particularly, in case of platooning, i.e., in case that the group is a group that performs a platooning (i.e., a group driving), RAT support capabilities of all UEs may not be the same. Namely, when UE(s) incapable of supporting the first RAT exists in the group, if the rest of UEs switch to the first RAT, V2X communication with the UE incapable of supporting the first RAT is impossible, whereby the platooning itself may be impossible. Hence, the problem of the unequal RAT support capabilities may be solved through the above configuration.

The message may include at least one of target RAT information, information related to a time of performing the switch to the first RAT, information indicating whether the message is the information indicating that the first RAT was selected or the information instructing the switch to the first RAT, identification information on a group communication, and identification information on the representative UE. In order to instruct other UE(s) to switch an RAT for performing a group communication or indicate a selected RAT, the representative UE may send a PC5 message. Such a PC5 message may include the aforementioned information(s). This PC5 message may be sent once or periodically for a valid time. The above-enumerated informations are described in detail as follows.

A) Target RAT information: This is PC5 RAT information that becomes a target for switching to which PC5 RAT or using (selecting) which PC5 RAT.

B) Information on a switch/use (selection) timing: This may designate 'as soon as receiving an instruction of switch/use' (explicitly or implicitly without including such information) or 'a specific hour/time'. In the latter case, it may provide 'several seconds after receiving an instruction' or 'a specific hour' such as a few minutes and a few seconds. Or, in the latter case, it may provide 'after several (transmission) frames after receiving an instruction'.

C) Information indicating whether the above information relates to a switch or a use (selection).

D) Identification information on a group communication: This may include various types such as identification information on a V2X service, identification information on a V2X application, identification information on a group, identification information on the group communication, address information (e.g., source/destination Layer-2 ID, source/destination IP address, etc.) used for the group communication, etc.

E) Identification information on a representative UE: This may include various types such as identification information on a UE used in an application layer, address information (e.g., source Layer-2 ID, source IP address, etc.) used for a group communication, etc. And, this may be one or more.

The first UE may be the representative UE of the group. The representative UE may include one of a leader (e.g., a leading UE exists in platooning or Cooperative Adaptive Cruise Control (CACC)) of a group communication), a UE at the head of a progress direction among UEs performing a group communication, a UE initiating a group communication, and a UE designated/elected to operate as a representative UE (this may be notified to other UEs in a manner of being self-designated by the UE or designated by a network or a UE-type RSU). The above information (e.g., information indicating that a UE itself is a leader) may be obtained by a UE from a V2X application or a layer managed by 3GPP.

Determining an RAT switch or use (selection) by a representative UE may be determined by a UE or a network or UE-type RSU through instruction. In the above description, when a representative UE sends a PC5 message indicating an RAT switch or use (selection) to another UE, such a PC5 message may include a PC5-D message, a PC5-S message, a PC5-U message or a PC5 message of a newly defined type for the purpose of the present disclosure. In case of the PC5 message of the newly defined type for the purpose of the present disclosure, for example, a PDCP SDU type (e.g., RAT switch, RAT selection, RAT configuration, RAT, etc.) may be newly defined in a PC5-U and used.

The above-described RAT selection or switch method for the group communication is applicable to a unicast communication as well. This is because it may be regarded as a group communication in which 2 UEs participate. And, the group communication may be construed as a multicast communication.

In some implementations, regarding the mapping information, a geographical area may be added to 'Solution #12:

3GPP PC5 RAT selection for a V2X application' in Section 6.12 of TR 23.786v0.6.0 as follows. Namely, a geographical area is added to "configuration/mapping of 'Tx Profiles' associated with the V2X services". This means that Tx profile(s) used for a specific V2X service in a specific area (geographical area) is established/configured. Usable Tx profiles per geographical area may be listed or usable geographical areas per Tx profile may be listed. If a specific Tx profile is usable irrespective of an area, geographical area information may not be included or it may be set to a value indicating all areas (e.g., all, *, etc.). The V2X services may include PSID or ITS-AIDs of the V2X applications for example.

Tx profile based PC5 RAT selection is applicable to unicast, multicast and group cast as well as broadcast. As described above, the addition of the geographical area may be set applicable to a broadcasted V2X service and/or a unicasted V2X service and/or a multicasted V2X service and/or a groupcasted V2X service.

Meanwhile, a method of switching/selecting an RAT used/applied for/to a group communication is applicable when various configurations used/applied for/to a group communication are updated for all UEs as well as applicable to an RAT. Although a method of switching/selecting RAT of UEs participating in a group communication is mainly described in the above description, it is extensively applicable as a method of switching/selecting an RAT used/applied for/to a specific V2X service or all V2X services of all UEs located in a specific area.

Meanwhile, the mapping information may include one or more of time information for using each of the one or more RATs, QoS parameter that should be satisfied at each of the one or more RATs, and congestion degree of each of the one or more RATs. They are respectively described in detail as follows.

a) Time information: For example, this indicates a timeslot usable by a corresponding RAT in a day and may be represented in interval unit of hours, minutes and seconds. (For example, this information is represented as 'prescribed hours, minutes and seconds~prescribed hours, minutes and seconds' and means that a corresponding RAT is used in a time corresponding to this interval.)

b) QoS parameters: This may include various QoS values that should be met on a PC5 operation using the RAT. For example, the QoS values may include a latency (or delay budget or transmission delay) related value, a packet error loss rate (or transmission failure or success rate) related value, a data rate related value, etc. Regarding what kind of time unit will be used to measure such a value, a time window may be provided together. For each of the parameters or in common to the parameters, such a measurement may be performed by a UE directly, and/or a network performs such a measurement, whereby whether the measurement is satisfied may be provided to the UE and/or obtained from another UE.

c) Congestion degree of RAT: This is the information indicating whether an RAT is congestive and may be variously represented as a radio frequency occupancy rate of RAT and the like.

Thus, when a multitude of RATs exist in mapping information (e.g., when a multitude of RATs are configured in a specific geographical area), various conditions usable/selectable by each RA may be provided together with the mapping information. This may be provided per RAT or in common to all RATs. Moreover, when a currently used/applied RAT fails in meeting the condition, such conditions may be used to determine whether to switch to another RAT that meets the condition. In addition, the condition may be used to determine whether to use/select which RAT for a V2X service.

For a UE supportive of multi-RAT including LTE and NR on a PC5 interface, 3GPP PC5 RAT(s) [The mapping of V2X services (e.g., PSID or ITS-AIDS of the V2X applications) to 3GPP PC5 RAT(s) with Geographical Area(s).] for V2X applications may be provisioned together with a parameter. This parameter may be set in a UE in advance. In case of in-coverage, such a parameter may be provisioned by signaling on a V3 reference point from a V2X control function within HPLMN. This method is based on the assumption that the V2X control function and V3 reference point defined for EPS are applicable to the 5G system. Alternatively, the provisioning may be performed on a network using a NAS message.

Figure 9:
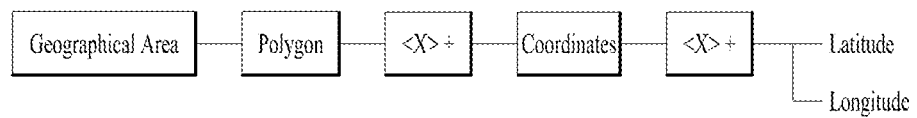
FIG. 9 is a diagram illustrating an example of mapping information in an embodiment of the present disclosure.

The above-mentioned information indicates that which PC5 RAT(s) is usable/selectable fora specific V2X service in which area (or use/selection is authorized or allowed). In the above description, the geographical area may be represented in a form shown in FIG. 9, i.e., a coordinate value or in various forms such as a PLMN unit, a Tacking Area (TA) unit, a cell unit, a base station unit, etc. Moreover, if the geographical area fails to exist in the mapping information, it may be construed as which PC5 RAT(s) is usable for a corresponding V2X service irrespective of an area. This is applicable through the present disclosure overall.

In the above description, types of PC5 RAT representatively include LTE (i.e., E-UTRA) and NR, by which the present disclosure is non-limited. And, all RATs capable of PC5 operation may correspond to the types of the PC5 RAT.

In case that a multitude of RATs exist in the mapping information, a first displayed (listed) RAT may be an RAT having a highest priority (this may correspond to the default RAT concept) on use/application and a last displayed (listed) RAT may be an RAT having a lowest priority on use/application, and vice versa. On the contrary, in case that a multitude of RATs exist in the mapping information, priority information (e.g., precedence value or priority value) is explicitly given to each RAT and may be then provided together with the mapping information. In this case, an RAT having a highest priority may be considered as a default RAT.

In case that a multitude of RATs exist in the mapping information, one or more informations in the following may be provided in addition.

i) Whether a UE is capable of changing (or switching) an RAT used/applied for/to a PC5 operation: This indicates whether a UE is allowed to change a currently used/applied PC5 RAT into another RAT. More specifically or separately, this may be provided in a manner of indicating whether a UE can change (switch) an RAT used/applied for/to a PC5 operation only if the UE is playing a role as a leader in a group communication. This may include an operation that a UE currently playing a role as a leader instructs group members of the group communication to change RAT. More specifically or separately, this may be provided in a manner of indicating whether a UE can change (switch) an RAT used/applied for/to a PC5 operation if operating as a UE-type RSU. This may include an operation that the UE currently operating as the UE-type RSU can instruct general UEs (vehicle UEs, pedestrian UEs) to change RAT. Or, it may mean an operation that the UE instructs general UEs to change RAT while not changing an RAT of its own. Due to absence of such information, the UE may be implicitly regarded as capable of changing (switching) the RAT used/applied for/to the PC5 operation.

ii) Whether a network is capable of changing (or switching) an RAT used/applied for/to a PC5 operation: This indicates whether an instruction of changing a RAT should be received from a network. In this case, if the network instructs to use/apply another RAT, a UE follows the instruction. In the above description, the network may include one or more of a RAN, a function included in a core network, and a V2X application server.

iii) Whether a UE-type RSU is capable of changing (or switching) an RAT used/applied for/to a PC5 operation: This indicates whether an instruction of changing a RAT should be received from a UE-type RSU. In this case, if the UE-type RSU instructs to use/apply another RAT, a UE follows the instruction.

iv) Whether a UE is capable of selecting an RAT used/applied for/to a PC5 operation: This indicates whether a UE is allowed to select a currently used/applied PC5 RAT into another RAT. More specifically or separately, this may be provided in a manner of indicating whether a UE can select an RAT to be used/applied for/to a PC5 operation only if the UE is playing a role as a leader in a group communication. This may include an operation that a UE currently playing a role as a leader informs group members of the group communication of the selected RAT. More specifically or separately, this may be provided in a manner of indicating whether a UE can select an RAT to be used/applied for/to a PC5 operation if operating as a UE-type RSU. This may include an operation that the UE currently operating as the UE-type RSU can inform general UEs of the selected RAT. Due to absence of such information, the UE may be implicitly regarded as capable of selecting the RAT to be used/applied for/to the PC5 operation.

v) Whether a network is capable of selecting an RAT to use/apply for/to a PC5 operation: This indicates whether an instruction of a selected RAT should be received from a network. In this case, if the network informs a UE of the selected RAT, the UE uses the corresponding RAT. And, the network may include one or more of a RAN, a function included in a core network, and a V2X application server.

vi) Whether a UE-type RSU is capable of selecting an RAT to use/apply for/to a PC5 operation: This indicates whether an instruction of a selected RAT should be received from a UE-type RSU. In this case, if the UE-type RSU informs a UE of the selected RAT, the UE uses the RAT.

If there simply exist two types of PC5 RAT, i.e., LTE and NR, changing (or switching) an RAT used/applied for/to a V2X service into another RAT may correspond to using LTE and then changing it into NR, and vice versa. In addition, if a default RAT is being used, it may correspond to changing the default RAT into a non-default RAT, and vice versa. In addition, if an RAT of a high priority is being used, it may correspond to changing the RAT into an RAT of a low priority, and vice versa.

If there are 3 or more types of PC5 RAT, reference/consideration for selecting an RAT candidate except a currently used RAT in case of changing into another RAT may include one or more of the followings.

Preferentially consider a high-priority RAT except a currently used RAT.
Preferentially consider a default RAT if a currently used RAT is not a default RAT.
Preferentially consider an RAT that meets a condition (if the above-described a) and b) are available).

The description about changing (or switching) an RAT used/applied for/to the V2X service into another RAT applies to the present disclosure overall.

If there are a multitude of PC5 RATs usable/applicable for/to a V2X service, selecting an RAT from them means selecting an RAT that meets the above-mentioned condition. If there are a plurality of RATs that meet the condition, it means that an RAT having a high priority among them is selected. This applies to the present disclosure overall.

Embodiment 2

A second embodiment relates to a method for a representative UE among UEs participating in a group communication to make a request for switching a PC5 RAT or a request for indicating a selected RAT to an infrastructure. The second embodiment is based on the contents described in Embodiment 1 and differs from the first embodiment in that the representative UE does not instruct other UE(s) to switch the PC5 RAT or indicate the selected RAT through a PC5 message but requests the infrastructure to do the same. The infrastructure may include one of a RAN, a V2X control function, a V2X application server, a core network function, and a UE-type RSU. This applies to the present disclosure overall.

When making an RAT switch request or a selected RAT indication request to the infrastructure, the representative UE may not have additional information included in the request and may have one or more informations, which are selected from the informations of A), B), C), D) and E) of Embodiment 1 and identification information of UEs participating in the group communication, included in the request.

In case of the switch request, the infrastructure having received the request from the representative UE instructs the UEs participating in the group communication to switch to the same target RAT at the same timing for the corresponding V2X service. In case of the request for the indication of the selected RAT, the infrastructure having received the request from the representative UE instructs the UEs participating in the group communication to use/apply the same target RAT at the same timing for the corresponding V2X service.

If the infrastructure is the RAN, it may give the instruction by broadcast or dedicated signaling to each UE. If the infrastructure is the V2X control function, it may give the instruction to each UE through a V3 interface. If the infrastructure is the V2X application server, it may give the instruction by unicast or through MBMS receivable by the corresponding UEs. If the infrastructure is the CN function, it may give the instruction through signaling (e.g., NAS message) to each UE or MBMS receivable by the corresponding UEs. If the infrastructure is the UE-type RSU, it may give the instruction through a PC5 message (this is similar to the aforementioned instruction through the PC5 message by the representative UE in the aforementioned description). Thus, a method for a UE to transmit instruction information to a UE applies to the present disclosure overall.

The infrastructure may send the instruction message once or periodically for a valid time. The valid time may be provided when the representative UE requests the instruction. Or, the valid time may be terminated if the representative UE requests the instruction termination explicitly. Or, the infrastructure may determine the termination by itself.

All the UEs (including the representative UE) participating in the group communication perform the RAT switch to the same target RAT or the RAT use/application for/to the RAT use/application at the same timing.

Embodiment 3

According to Embodiment 3, an infrastructure determines to switch an RAT used/applied to/for a group communication or selects an RAT to use/apply for/to the group communication and then gives an instruction of the determination or selection to UEs participating in the group communication.

First of all, in case of a switch, an infrastructure monitors whether a currently used/applied RAT is appropriate for a specific group communication. Whether to be appropriate may include whether the aforementioned conditions such as a) time information, b) QoS parameters, and c) RAT congestion degree are satisfied. In order to determine whether the condition is met, the infrastructure may perform self-measurement and/or collect measurement information from a UE.

If determined as not appropriate, the infrastructure instructs all UEs participating in the group communication to switch a currently used/applied RAT from a first RAT to a second RAT. In doing so, the instruction may be given in a manner of including one or more of the informations of A), B), C), D) and E) of Embodiment 1.

Secondly, in case of an RAT selection, an infrastructure monitors a state of an RAT usable to select an RAT to be used/applied for/to a specific group communication and determines whether a use is appropriate. For example, whether to be appropriate may be whether the aforementioned condition such as a), b) and c) is satisfied. In order to determine whether the condition is met, the infrastructure may perform self-measurement and/or collect measurement information from a UE.

The infrastructure selects an appropriate RAT and then gives an instruction of an RAT to use/apply to all UEs participating in the group communication. In this case, the instruction may be given in a manner of including one or more of the informations A) to E) of Embodiment 1. If a multitude of RATs are appropriate, a high-priority RAT or a default RAT may be selected. Or, an RAT of a lower congestion degree may be selected.

In the above descriptions of Embodiment 2 and Embodiment 3, the infrastructure may send the instruction message once or periodically for a valid time.

In the above description, an operation of switching an RAT used/applied in a specific area or group for a V2X service from a first RAT to a second RAT may be based on the assumption that all UEs participating in a communication for the V2X service support the above operation. Moreover, in the above description, an operation of selecting an RAT used/applied in a specific area or group for a V2X service may be based on the assumption that all UEs participating in a communication for the V2X service support the above operation.

In the above description, the V2X service is interchangeably used with a V2X application. And, a PC5 operation may include a PC5 discovery (or, a D2D discovery, a direct discovery, a ProSe discovery) as well as a PC5 communication (or, a D2D communication, a direct communication, a ProSe communication). Besides, the PC5 operation has the meaning of including all operations that use PC5. In V2X, for example, PC5 operations mean an operation of transceiving a V2X message through PC5 by a UE, an operation of transceiving various data generated from a V2X application through PC5 by a UE, an operation of transceiving various informations associated with V2X through PC5 by a UE, an operation of establishing a link or 1:1 connection to another UE through PC5 by a UE, an operation of discovering another UE through PC5 by a UE, etc.

In addition, contents proposed in the present disclosure are non-limited by names currently used in the 5G system. In the 5G system, unlike EPS, an interface name defined for D2D communication may not be PC5. And, those skilled in the art may understand the present disclosure by applying an interface name newly defined for D2D communication. Besides a PC5 interface, various interfaces (e.g., V1, V2, V3, etc.) defined in the existing EPS may be identically used in the 5G system or newly defined as new names entirely or in part. Thus, by considering this, the present disclosure is understood.

In the present disclosure, a UE may include a UE such as a vehicle UE and a pedestrian UE, or a UE-type RSU. Namely, the UE includes any device capable of operating in UE form or performing a PC5 operation. The proposals of the present disclosure, which efficiently provide a V2X service through 5G system (e.g., 5G mobile communication system and next generation mobile communication system) and EPS, may be configured in combination of one or more operations/configurations/steps.

Table 5 and Table 6 in the following relate to the contents of contribution documents submitted by the inventors with respect to the present disclosure.

TABLE 5

SA WG2 Meeting #122bis
Aug. 21-25, 2017, Sophia Antipolis, France
Source: LG Electronics
Title: New solution for KI#2
Document for: Approval
Agenda Item: 6.6
Work Item/Release: FS_eV2XARC/Rel-15
Abstract of the contribution: This paper proposes to add a new solution for K#2 into TR 23.786.
1. Discussion
The following key issue was captured in TR 23.786 at the previous meeting for UEs supporting multiple RATs over PC5 interface.
5.2 Key Issue #2: 3GPP PCS RAT selection for a V2X application
5.2.1 General description
A UE may support multiple radio access technologies (RATs) over PC5 interface, including LTE and NR. For such UE, the most suitable 3GPP PC5 RAT(s) for V2X applications should be selected based on various criteria. For example, for the V2X application requiring low latency, the PC5 RAT that meets the required latency should be selected.
To support the proper selection of 3GPP PC5 RAT to use for a V2X application, the following aspects need to be studied:
What parameters should be considered as input to 3GPP PC5 RAT selection for each V2X application, e.g.

TABLE 5-continued

QoS parameters, RAN related parameters such as expected range of a RAT, operator policy,
preferences for each V2X application, peer UE capabilities, etc.?
When and how the 3GPP PC5 RAT selection is performed? Is the 3GPP PCS RAT selected
before sending/receiving each V2X message, or is the 3GPP PCS RAT selected based on
static configuration for each V2X application?
How can 3GPP system support the 3GPP PCS RAT selection for the V2X application?
When studying the above aspects, the following need to be considered:
When the UE is non-roaming and when the UE is roaming;
When the UE is in coverage and when the UE is out of coverage.
Editor's note: When necessary, RAN WGs should be involved during the study of this key
issue
This paper proposes a new solution for this key issue.

TABLE 6

2. Proposal
The following changes are proposed.
* * * * Start of 1st Change * * * *
6.X Solution #X: 3GPP PC5 RAT selection for a V2X application
6.X.1 Functional Description
This solution corresponds to the Key Issue #2 "3GPP PC5 RAT selection for a V2X
application".
For a UE supporting multiple RATs over PC5 interface, including LTE and NR, suitable
3GPP PC5 RAT(s) for V2X applications are provisioned with the following parameters:
The mapping of V2X services (e.g. PSID or ITS-AIDs of the V2X applications) to 3GPP
PC5 RAT(s) with
Geographical Area(s).
These parameters can be pre-configured in the UE, or, if in coverage, provisioned by
signalling over the V3 reference point from the V2X Control Function in the HPLMN. This
solution assumes that the V2X Control Function and the V3 reference point defined for EPS
is also applied to 5G System.
Whenonly one 3GPP PC5 RAT is mapped to any V2X service within Geographical Area,
the HE uses the 3GPP PC5 RAT for the V2X service in the area. On the other hand, when
morethan one 3GPP PC5 RAT is mapped to any V2X service within Geographical Area, the
UE can select one of the 3GPP PC5 RATs to use for the V2X service in the area and the first
3GPP PC5 RAT is considered default.
Editor's note: It is FFS how the UE selects a 3GPP PC5 RAT from the provisioned 3GPP
PC5 RATs for a V2X service.
6.X.2 Procedures
Editor's note: Describes the high-level operation, procedures and information flows for the
solution.
6.X.3 Impact on existing entities and interfaces
Editor's note: Impacts on existing nodes or functionality will be added.
6.X.4 Topics for further study
Editor's note: Topics for FFS will be collected for this particular functionality.
6.X.5 Conclusions
Editor's note: Conclusions will be collected for this particular functionality.
* * * * End of Changes * * * *

Figure 10:
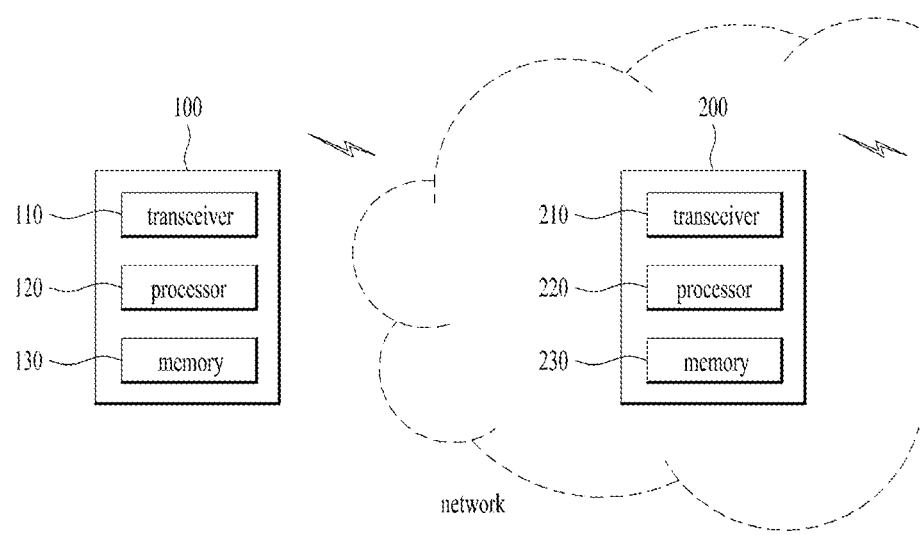
FIG. 10 is a diagram illustrating a configuration of a node device according to an embodiment of the present disclosure.

FIG. 10 is a diagram illustrating configurations of a UE and a network node according to one example of the present disclosure.

Referring to FIG. 10, a User Equipment (UE) 100 according to the present disclosure may include a transceiver 110, a processor 120 and a memory 130. The transceiver 110 may be configured to transmit various signals, data and informations to an external device and receive various signals, data and informations from the external device. The UE 100 may be connected to the external device by wire and/or wireless. The processor 120 may control overall operations of the UE 100 and may be configured to perform a function of operating information to be transceived with the external device by the UE 100 and the like. The memory 130 may store the operated information and the like for a prescribed time and may be substituted with a component such as a buffer (not shown) and the like. And, the processor 120 may be configured to perform UE operations proposed by the present disclosure. Particularly, according to a process, a first UE may check mapping information, select a first RAT according to the mapping information, and sends a message containing one of an information indicating that the first RAT has been selected and an information instructing a switch to the first RAT to all UEs belonging to a group. Here, the mapping information may indicate that one or more RATs are mapped per V2X service for a geographical area.

Referring to FIG. 10, a network node 200 according to the present disclosure may include a transceiver 210, a processor 220 and a memory 230. The transceiver 210 may be configured to transmit various signals, data and informations to an external device and receive various signals, data and informations from the external device. The network node 200 may be connected to the external device by wire and/or wireless. The processor 220 may control overall operations of the network node 200 and may be configured to perform a function of operating information to be transceived with the external device by the network node 200 and the like. The memory 230 may store the operated information and the like for a prescribed time and may be substituted with a component such as a buffer (not shown) and the like. And, the processor 220 may be configured to perform network node operations proposed by the present disclosure.

In the above-mentioned specific configurations of the UE 100 and the network node 200, the contents or items explained in the descriptions of the various embodiments of the present disclosure may be independently applicable or two or more embodiments of the present disclosure may be simultaneously applicable. And, redundant descriptions shall be omitted from the following description for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software, configuration, a method according to embodiments of the present disclosure may be implemented in the form of a module, a procedure; a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

What is claimed is:

1. A method of performing an operation related to a Radio Access Technology (RAT) switch by at least one Vehicle-To-Everything (V2X) User Equipment (UE) in a wireless communication system, the method comprising:
   checking a mapping information by a first V2X UE;
   selecting, by the first V2X UE, a first RAT according to the mapping information;
   sending, by the first V2X UE to all second V2X UEs that belong to a group of the first V2X UE, a message containing information indicating that the first RAT has been selected and information instructing a switch to the first RAT;
   receiving, from all of the second V2X UEs that belong to the group, a response to the selection and the instruction, for determining whether or not to perform the RAT switch by the group; and
   performing, by the group, the RAT switch to the first RAT, based on all of the second V2X UEs that belong to the group being supported by the first RAT,
   wherein the mapping information is that one or more RATs are mapped per V2X service for a geographical area.

2. The method of claim 1, wherein based on any one of the second V2X UEs that belong to the group failing to be supported by the first RAT, the selection of the first RAT or the switch to the first RAT is skipped.

3. The method of claim 1, wherein the mapping information comprises a time information for using each of the one or more RATs, a Quality of Service (QoS) parameter that should be satisfied at each of the one or more RATs, and a congestion degree of each of the one or more RATs.

4. The method of claim 3, wherein the QoS parameter comprises one or more of a latency, a delay budget, a transmission delay, a packet error loss rate, a transmission failure rate, a transmission success rate, and a data rate related value.

5. The method of claim 1, wherein the first V2X UE is a representative UE of the group.

6. The method of claim 5, wherein the representative UE comprises one selected from the group consisting of a leader of a group communication, a UE at the head of a progress direction among UEs performing the group communication, a UE initiating the group communication, and a UE designated/elected to operate as the representative UE.

7. The method of claim 1, wherein the one or more RATs comprise evolved UMTS (Universal Mobile Telecommunication System) terrestrial radio access network (E-UTRAN) and New Radio (NR).

* * * * *